United States Patent [19]

Hintennach et al.

[11] Patent Number: 5,048,752
[45] Date of Patent: Sep. 17, 1991

[54] METHOD AND APPARATUS FOR HEAT CARRIER CIRCULATION FOR A VEHICLE HEATING SYSTEM HAVING A HEATER INDEPENDENT OF THE ENGINE

[75] Inventors: Hans Hintennach; Dietrich Schmalenbach, both of Baltmannsweiler, Fed. Rep. of Germany

[73] Assignee: J. Eberspächer, Esslingen, Fed. Rep. of Germany

[21] Appl. No.: 242,376

[22] Filed: Sep. 9, 1988

[30] Foreign Application Priority Data

Sep. 11, 1987 [DE] Fed. Rep. of Germany ....... 3730598

[51] Int. Cl.⁵ .............................................. B60H 1/02
[52] U.S. Cl. ................................ 237/2 A; 237/12.3 B; 123/142.5 R
[58] Field of Search ............. 237/2 A, 12.3 A, 12.3 B, 237/12.3 C; 123/142.5 R

[56] References Cited

U.S. PATENT DOCUMENTS 3,122,319 2/1964 Friedl et al. .................... 237/12.3 B
4,018,380 4/1977 Baier ............................. 237/12.3 C

FOREIGN PATENT DOCUMENTS 1011313 5/1977 Canada ................................. 237/13

Primary Examiner—Henry A. Bennet
Attorney, Agent, or Firm—McGlew & Tuttle

[57] ABSTRACT

A heat carrier circulation for a vehicle heating system includes a heater independent of the engine. The heat carrier circulation contains a forward line which leads from the internal combustion vehicle drive engine to a heating system heat exchanger for the vehicle interior and which has a parallel branch in which the heater is disposed; and a return line leading from the heating system heat exchanger back to the internal combustion engine. The heat exchanger circulation contains a connection which goes from the return line to the part of the forward line located ahead of the heater. Installed in the heat carrier circulation is a settable valve which controls the ratio at which heat carrier flows to the heater from the connecting line and from the internal combustion engine.

17 Claims, 1 Drawing Sheet

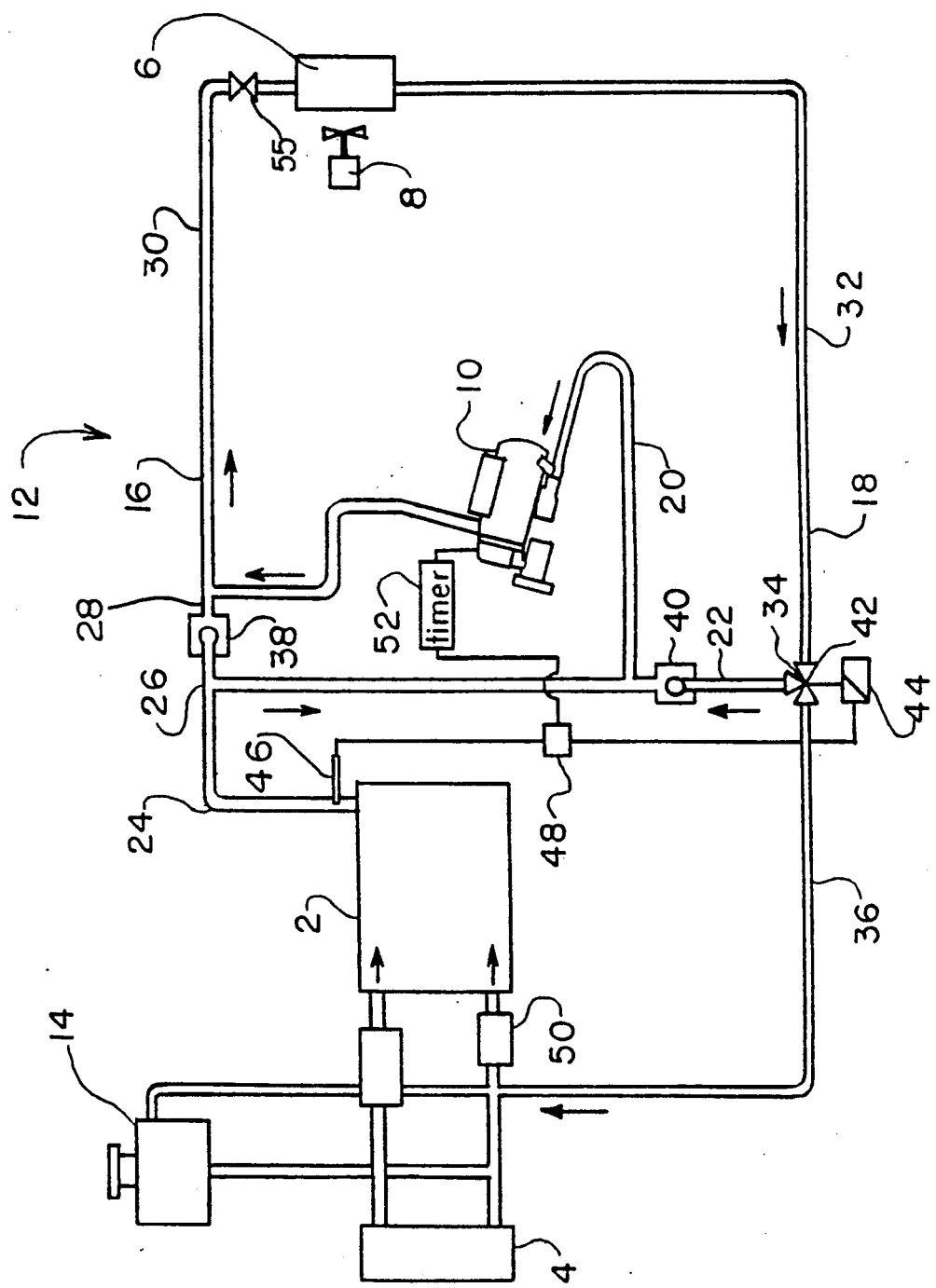

METHOD AND APPARATUS FOR HEAT CARRIER CIRCULATION FOR A VEHICLE HEATING SYSTEM HAVING A HEATER INDEPENDENT OF THE ENGINE

FIELD AND BACKGROUND OF THE INVENTION

The invention relates in general to heating systems and in particular to a new and useful method and heat carrier circulation apparatus for a vehicle heating system with a heater independent of the engine.

In accordance with the invention the heat carrier circulation apparatus includes a forward line which leads from the internal combustion vehicle drive engine to a heating system heat exchanger for the vehicle interior and which has a parallel branch in which a separate heater is disposed; and a return line leading from the heating system heat exchanger back to the internal combustion engine.

In present heat carrier circulation systems, the heat carrier, coming from the heater, successively flows through the heating system heat exchanger and the internal combustion engine so that the heating system heat exchanger and the internal combustion engine are heated essentially to the same temperature.

SUMMARY OF THE INVENTION

The invention provides a heat carrier circulation system in which the heat supply of the heat carrier can be conducted selectively to where it is needed to the best advantage.

According to the invention, the heat carrier circulation is characterized, according to the invention, in that it contains a connecting line leading from a return line to that part of a forward line which is located ahead of the heater, and in that there is installed in the heat carrier circulation an adjustable valve which controls the ratio at which heat carrier flows to the heater from a connecting line and from the internal combustion engine.

Consequently, the heat carrier circulation, according to the invention, contains a partial circulation comprising, in part or in toto, a parallel branch which is connected with the heater; an adjacent part of a forward line, a heating system heat exchanger, a part of a return line, and a connecting line.

An adjustable valve can be brought into a first position so that the heat carrier circulates substantially in a partial circulation only so that the heat supply of the heat carrier is concentrated entirely on the heating system heat exchanger. The valve can also be brought into a second position so that no heat carrier flows through the connecting line so that the heat carrier coming from the heating system heat exchanger flows through the internal combustion engine before arriving at the heater again. Also, the valve can be brought into intermediate positions so that the heat carrier flow, coming from the heating system heat exchanger, is divided into a direct backflow to the heater and a backflow through the internal combustion engine to the heater in any desired ratio. In the last mentioned possibility, an intermediate position is particularly advantageous and preferred in which only such a part of the heat carrier flow is conducted through the internal combustion engine that it is heated to or kept at a temperature range from 10° to 30° C., preferably 15° to 25° C. In this case, therefore, only that amount of heat carrier flow is branched off to heat the internal combustion engine as is required to secure good startability for it; the rest of the heat carrier's heat supply is concentrated on the heating system heat exchanger and thus on the vehicle interior.

The heat carrier is a liquid, usually water or a water-/antifreeze mixture. The term "vehicle" should be understood in a comprehensive sense and should include not only land vehicles such as passenger cars, trucks, buses, camping vehicles and the like, but especially also air vehicles and water vehicles such as motorboats. The term "parallel branch" should be understood functionally and not geometrically; there is in the forward line of the heat carrier circulation a bifurcation into two branches which are rejoined further back. The heater is disposed in one of these branches.

Accordingly, it is an object of the invention to provide an internal combustion engine temperature control and space heating system which includes an internal combustion engine having a liquid cooling circulation system and a separate liquid coolant heater which has a space heater associated therewith for heating the vehicle compartment and which includes arranging the separate heater heat fluid which is transmitted to a heat exchanger for the space heater connecting the return of both the heater and the space heater to the cooling system of the internal combustion engine and including controlling the operation of the space heater and its circulation in accordance with the temperature which is sensed at the internal combustion engine cooling system so as to regulate the flow of heated liquid to the engine cooling system in accordance with the temperature sensed whereby to ensure initial warmup of the engine and also to ensure circulation of heated liquid to the engine only when the liquid falls below a predetermined temperature.

A further object of the invention is to provide an internal combustion engine temperature control and space heating system which includes an internal combustion engine which has a liquid cooling circulation system and including a separate liquid heater with a space heater heat exchanger connected to the liquid heater for circulation of heated liquid from the heater to the space heater heat exchanger and in connection from the internal combustion engine cooling circulation system to the space heater and heat exchanger thereof and to said liquid heater with a return connection from the heat exchanger and the heater having a three-way valve connected therein between the return connection and the internal combustion engine circulating system and which includes sensing means in the connection between the returns from the heater and the heat exchanger to the internal combustion engine for selectively controlling the quantities of flow for the internal combustion engine cooling and to the heat exchanger for the space heater and for controlling the operation of the space heater.

A further object of the invention is to provide a space heater circulation for a vehicle heating system with a heater independent of the drive engine which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

The only figure of the drawings is a schematic showing of an internal combustion engine cooling system having a connection with a coolant heater which in turn has a connection with a space heater for the vehicle constructed in accordance with the invention.

DESCRIPTION OF THE PREFERRED EMBODIMENTS

Referring to the drawings in particular the invention embodied therein comprises a method and apparatus for the control of a cooling liquid which is circulated through a radiator 4 of an internal combustion engine 2 so that the engine is heated for example, during cold startups in a rapid manner and for ensuring that the engine is not overheated. In accordance with the invention, a heater 10 for heating the coolant or heat exchange liquid is connected in a circuit with a heat exchanger portion of a space heater 6 and it operates independently of the internal combustion engine 2. In accordance with the invention, a control is provided for ensuring a desirable flow of heated liquid from the liquid heater 10 to the circulating system or radiator 4 of the internal combustion engine 2, and for this purpose, a three-way valve 42 is provided for controlling return circulation from the heat exchanger 6 and from the heater 10 which depends mainly on the temperature of operation of the cooling liquid circulated through the cooling system of the internal combustion engine 2. For this purpose, the control means in addition to the valve 34 includes a control element 48 which is responsive to temperature sensed by a temperature sensing device 46 of the internal cooling liquid circulated through the internal combustion engine 2.

In the drawing may be seen the internal combustion engine 2 with conventionally coordinated radiator 4, the heating system heat exchanger or space heater 6, usually disposed in the area below the vehicle's windshield such that heating air is either transported into the vehicle interior from the outside or circulated inside the vehicle. A blower 8 is coordinated with the heating system heat exchanger 6, and a heater 10 is independent of the engine. The heater 10 can generate heat by burning fuel, in particular gasoline or diesel oil and transfer it through a heat carrier circulation or system through a built-in heat exchanger.

Apart from the lines leading to the radiator 4 and to an expansion tank 14, the heat carrier circulation 12 comprises a forward line 16 going from the internal combustion engine 2 to the heating system heat exchanger 6; a return line 18 going from the heating system heat exchanger 6 back to the internal combustion engine 2; a parallel or transverse branch 20 belonging to the forward line 16 and containing the heater 10; and a connecting line 22. The forward line 16 comprises a first part 24 from the internal combustion engine 2 to a branch-off point 26 of the transverse branch 20; an adjoining second part 28 up to the rejoining point of the transverse branch 20; and a third part 30; adjoining the second part 20, up to the heating system heat exchanger 6. The return line 18 comprises a first part 32 from the heating system heat exchanger 6 to a branch-off point 34 of the connecting line 22, and of an adjoining second part 36 up to the internal combustion engine 2. The connecting line 22 goes to a point of the transverse branch 20 located ahead of the heater 10 as viewed in flow direction. But the connecting line 22 could also lead to the first part 24 of the forward line 16.

Installed in the second part 28 of the forward line 16 is a check valve 38 through which a heat carrier can flow in a forward direction. In the connecting line 22 there may be installed a check valve 55 through which heat carrier can flow in the direction from the return line 18 to the heater 10. Designated 42 is a valve in the third part 30 of the forward line 16, by means of which the heat carrier flow to the heating system heat exchanger 6 can be opened wide, partly opened, or shut off. The arrows in the drawing indicate the heat carrier flow direction in the various lines of the heat carrier circulation 12.

At the branch-off point 34 where the connecting line 22 branches off the return line 18 is installed a thermostatic three-way valve or adjustable valve 42 which makes possible three separate operational conditions. In a first position in which all of the heat carrier flows from the first part 32 of the return line 18 into the connecting line 22; a second position in which all of the heat carrier flows from the first part 32 of the return line 18 into the second part 36 of the return line 18; and intermediate positions in which the heat carrier from the first part 32 of the return line 18 is divided into part flows to the connecting line 22 and to the second part 36 of the return line 18 in any desired ratios.

The positions of valve 42 are effected by a valve drive, e.g. an electrothermal drive, an electric motor drive, a magnet, or an elastomer element 44 The valve 42 is controlled by a temperature sensor 46 sitting in the first part 24 of the forward line 16 near the internal combustion engine 2. Designated 48 is a control or regulating logic which controls the valve 42 as directed by the temperature sensor, possibly with set-point comparison.

The heater 10 is equipped with an operation control neither shown nor having a reference symbol.

The heat carrier circulation 12 and the components contained in it operate as follows:

When the internal combustion engine 2 is shut off after the vehicle has been driven, the heat carrier in the heat carrier circulation 12 is normally in a temperature range from about 80° to 100° C., the forward line 16 being somewhat hotter than the return line 18. This applies, regardless of whether or not the heater 10 was in operation while the vehicle was being driven, e.g. in extremely cold weather. If the heater 10 was not in operation, the transverse branch 20 may be relatively cold because little or no heat carrier flowed through the transverse branch 20, flowing through the second part 28 of the forward line 16 instead. After shutting off the internal combustion engine 2, the heater 10 kicks in automatically, provided its main switch is in the ON position. As long as the heat carrier temperature, picked up by the temperature sensor 46, is above a second threshold temperature, e.g. in the 60° to 80° C. range, preferably 65° to 75° C., only an integrated heat carrier circulating pump is turned on at the heater 10, but not the burner of the heat generator. In addition, in this phase, the valve 42 is in its first position, in which the heat carrier flows from the first part 32 of the return line 18 into the connecting line 22 only. A part circulation is thus formed, comprised of a rear portion of the transverse branch 20 with the heater 10, the third part of the forward line 16, the heating system heat exchanger 6, the first part 32 of the return line 18, and the connecting line 22. Consequently, the amount of heat carried by the heat carrier in this part circulation is utilized to heat the vehicle interior.

If the second threshold temperature is fallen below, the heater 10 kicks in completely so as to generate heat for the part circulation. A usual temperature range for this heating operation is 70° to 85° C. in the third part 30 of the forward line 16. During the operating phases described so far, the heat carrier gradually cools down in the remaining part of the heat carrier circulation 12 comprising the second part 36 of the return line 18, the internal combustion engine 2, the first part 24 of the forward line 16, the second part 28 of the forward line 16 and the front portion of the transverse branch.

If, in the first part 24 of the forward line 16, the heat carrier temperature, acquired by the temperature sensor 46, drops below a first threshold temperature which may, for instance, be in the neighborhood of 20° C., the valve 42 is controlled in the direction of its second position so that a part of the heat carrier, still quite warm even behind the heating system heat exchanger 6, flows from the first part 32 of the return line 18 through the second part of the return line 18 to the internal combustion engine 2, from whence it continues on. Consequently, heat is fed to the internal combustion engine 2. The valve 42 is controlled so that by continuously repositioning the valve 42 in both directions, or by switching the valve 42 back and forth between its first and second position, a temperature of approximately 20° C. is maintained at the outlet of the internal combustion engine 2. Thus, only as much heat carrier is branched off from keeping the internal combustion engine 2 warm as is required to maintain the said temperature, whereas the normally greater part of the heat generated remains in the part circulation described.

The blower 8 of the heating system heat exchanger 6 is coupled to a control (not shown) which turns the blower 8 on and off so as to maintain an essentially constant temperature in the vehicle interior. This temperature inside the vehicle is settable.

The particularly important, last described operating mode which keeps the temperature of the internal combustion engine 2 at about 20° C. may also be selected, in particular, whenever the internal combustion engine is not shut off after the vehicle was driven previously, but the preferred heating up of the vehicle interior is desired. Typical examples are the preheating of the vehicle interior before starting on a trip after a cold night, or a longer stay of a person in the vehicle while the internal combustion engine is stopped, or supplementing the heat output of the still relatively cold internal combustion engine after starting on a trip.

The heater 10 may further be equipped with a settable automatic timer 52 to which the valve 42 is connected also. The timer 52 may be designed so that it controls not only the turn-on of the heater 10, but, preferably with a time interval after turning the heater 10 on, the repositioning of the valve 42 also. A typical example is the exclusive heating of the driver's cab of a truck during the night when the driver makes a stop to sleep, and adding the engine preheating at a certain time, such as an hour, prior to the scheduled departure of the truck. Another example is preheating a passenger car after a cold night. In a first time phase, the entire heat carrier flow is conducted from the heating system heat exchanger 6 through the internal combustion engine 2 to heat it up quickly enough because of its relatively large mass. In a second time phase, according to the operating mode described earlier in detail, the heat carrier's heat supply is concentrated more on the heating system heat exchanger 6 and the internal combustion engine 2 is kept at about 20° C. so that the windows of the vehicle interior are de-iced.

It is pointed out that, as an alternative, the valve 42 may be located at the connecting point between the connecting line 22 and the parallel branch 20 of the forward line 16 or at the branch-off point of the transverse branch 20. The functions described will not change because it is the valve 42 in all cases mentioned which controls the ratio at which the heater 10 aspirates heat carrier through the connecting line 22 from the return line 18 and/or from the internal combustion engine 2. In the two last mentioned cases the check valve 40 is not needed.

The described valve 42 is a three/two-way valve, i.e. a valve with three connections and two extreme positions. The control action of the valve 42 is preferably proportional. It is pointed out that a simpler ON-OFF valve with intermediate positions may be provided, e.g. in the second part 36 of the return line 18, in the connecting line 22, or in the front part of the transverse branch 20, instead of the described three-way valve 42. It is also possible with such a valve to provide a control function such that the heater 10 aspirates more or less heat carrier through the connecting line 22 directly from the return line 18 and correspondingly less or more heat carrier from the first part 24 of the forward line 16.

The internal combustion engine 2 is equipped with a water pump 50 in the usual manner. There are further, in the usual manner, two connecting lines between the internal combustion engine 2 and its radiator 4.

Generally speaking, the valve 42 is preferably a temperature dependently and/or time dependently controlled valve, in particular a three/two-way valve.

While specific embodiments of the invention have been shown and described in detail to illustrate the application of the principles of the invention, it will be understood that the invention may be embodied otherwise without departing from such principles.

What is claimed is:

1. An engine temperature control and heating system, comprising:
   a heat carrier;
   an engine cooled and heated by said heat carrier;
   a heat generator adding heat to said heat carrier and having a first connection and a second connection;
   a space heat for removing heat when heat is desired;
   a forward line for transporting said heat carrier between said engine and said space heater, said forward line having a first branch-off point adjacent to said engine and a second branch-off point adjacent to said space heater, said second branch-off point being connected to said second connection of said heat generator;
   a return line for transporting said heat carrier between said space heater and said drive engine, said return line having a third branch-off point;
   a connecting line for transporting said heat carrier between said first branch-off point in said forward line and said third branch-off point in said return line, said connecting line having a fourth branch-off point connected to said first connection of said heat generator; and a check valve and a plurality of control valves positioned in one of said lines causing one of the following three separate circulation paths to be selectable, a first path having said heat carrier move from said engine to said space heater and back to said engine, a second path having said heat carrier move from said engine though said heat generator and said space heater and return to said engine, and a third path said heat carrier move from said heat generator through said space heater and return to said heat generator.

2. A vehicle drive engine temperature control and vehicle interior heating system, comprising
 (a) an internal combustion drive engine;
 (b) a heat generator, having a heat exchanger, for generating heat by burning fuel;
 (c) a space heater having a heat exchanger for heat exchange with said vehicle interior;
 (d) a liquid heat carrier circulation system which connects by a forward line said drive engine to said heat generator heat exchanger and said heat generator heat exchanger to said space heater heat exchanger, and which connects, by a return line, said space heater heat exchanger to said drive engine;
 (e) said circulation system comprising further a connecting line leading from a first branch-off point in said return line to a second branch-off point in said forward line, said second branch-off point being located between said drive engine and said heat generator heat exchanger, thereby forming a liquid heat carrier circulation path which includes said heat generator heat exchanger and said space heater heat exchanger and excludes said drive engine; and
 (f) a thermostatic control valve means in said liquid heat carrier circulation system for selectively controlling the quantities of liquid heat carrier flow from said connecting line to said combustion heater heat exchanger and from said drive engine to said combustion heater heat exchanger.

3. A method for operating an engine temperature control and heating system having a space heater and independently operable heat generator, the method comprising the steps of:
 passing a heat carrier through the engine;
 dividing said heat carrier into a forward line and a connecting line;
 passing said heat carrier from said connecting line through the heat generator;
 passing said heat carrier from the heat generator through the space heater;
 passing said heat carrier from said forward line through the space heater;
 dividing said heat carrier into a return line and said connecting line;
 passing said heat carrier from said return line through the engine; and
 controlling the passing of said heat carrier to select one of the following heat carrier paths, a first path having said heat carrier move from the engine to the space heater and back to the engine, a second path having said heat carrier move from the engine though the heat generator and the space heater and return to the engine, and a third path having said heat carrier move from the heat generator through the space heater and return to the heat generator.

4. A method in according to claim 3 wherein a heat carrier is controlled by the heat generator so as to maintain a temperature of 10° to 30° C. in the engine.

5. A method in according to claim 3, wherein during initial startup of the engine the heat generator is operated so that it transmits a majority if its fluid to the engine.

6. A method in according to claim 3, wherein said heat carrier which is heated by the heat generator is directed to the engine only when its temperature falls below a predetermined amount, and in other instances said heat carrier is circulated either to the space heater or the heat generator is stopped.

7. A system according to claim 1, wherein one of said control valves is located in said connecting line.

8. A system according to claim 1, wherein one of said control valves is located in said return line between said third branch-of point and said engine.

9. A system according to claim 1, wherein one of said control valves is located in said forward line between said engine and said second branch-off point.

10. A system according to claim 1, wherein said plurality of control valves is a three-way valve located at said first branch-off point.

11. A system according to claim 1, wherein said plurality of control valves is a three-way valve located at said third branch-off point.

12. A system according to claim 2, further including a control and a sensor provided in said forward line between said drive engine and said first branch-off point, said sensor being connected to said control and said control being connected to said control valve for actuating said control valve.

13. A system according to claim 12, wherein said sensor is positioned close to said drive engine.

14. A system according to claim 2, further including a timer for actuating said heat generator and said control valve.

15. A system according to claim 12, further including a timer for actuating said heat generator and said control of said control valve.

16. An internal combustion engine temperature control and space heating system according to claim 1, wherein a signal generator generates a switching signal based on the temperature of said heat carrier circulated through said engine.

17. An internal combustion engine temperature control and space heating system according to claim 16, wherein said signal generator generates a switching signal in response to a signal received from a timer.

* * * * *